(12) United States Patent
Osterfeld et al.

(10) Patent No.: US 9,714,000 B1
(45) Date of Patent: Jul. 25, 2017

(54) ACTIVE VENT ACTUATION SYSTEM

(71) Applicant: TK Holdings Inc., Auburn Hills, MI (US)

(72) Inventors: Douglas L. Osterfeld, Waterford, MI (US); James P. Karlow, Commerce Township, MI (US); Bruce A. Stevens, Oakland Township, MI (US)

(73) Assignee: TK Holdings Inc., Auburn Hills, MI (US)

( * ) Notice: Subject to any disclaimer, the term of this patent is extended or adjusted under 35 U.S.C. 154(b) by 0 days.

(21) Appl. No.: 14/841,633

(22) Filed: Aug. 31, 2015

Related U.S. Application Data

(60) Provisional application No. 62/043,917, filed on Aug. 29, 2014.

(51) Int. Cl.
*B60R 21/239* (2006.01)

(52) U.S. Cl.
CPC .... *B60R 21/239* (2013.01); *B60R 2021/2395* (2013.01)

(58) Field of Classification Search
CPC .......... B60R 21/239; B60R 2021/2395; B60R 21/26; B60R 2021/2765; B60R 21/276
See application file for complete search history.

(56) References Cited

U.S. PATENT DOCUMENTS

| | | | | |
|---|---|---|---|---|
| 2006/0290118 | A1* | 12/2006 | Thomas | B60R 21/2338 280/739 |
| 2013/0119645 | A1* | 5/2013 | Eckert | B60R 21/239 280/728.2 |
| 2014/0008901 | A1* | 1/2014 | Kranzle | B60R 21/217 280/740 |
| 2014/0217712 | A1* | 8/2014 | Nakamura | B60R 21/2338 280/739 |
| 2015/0239424 | A1* | 8/2015 | Nebel | B60R 21/2338 280/729 |
| 2015/0283973 | A1* | 10/2015 | Jang | B60R 21/239 280/743.2 |
| 2015/0314747 | A1* | 11/2015 | Weber | B60R 21/239 280/728.3 |
| 2016/0001733 | A1* | 1/2016 | Kim | B60R 21/233 280/728.3 |
| 2016/0031408 | A1* | 2/2016 | Ko | B60R 21/239 280/729 |

FOREIGN PATENT DOCUMENTS

SE  WO 2014082912  A1 *  6/2014  ...........  B60R 21/239

OTHER PUBLICATIONS

Machine translation of WO2014/082912.*

* cited by examiner

*Primary Examiner* — Barry Gooden, Jr.
(74) *Attorney, Agent, or Firm* — L.C. Begin & Associates, PLLC.

(57) ABSTRACT

An airbag system includes an airbag with a vent hole formed therein, an actuator operatively coupled to the airbag, and a vent hole cover operatively coupled to the airbag so as to cover the vent hole and so as to form an enclosure extending between the actuator and the vent hole.

16 Claims, 13 Drawing Sheets

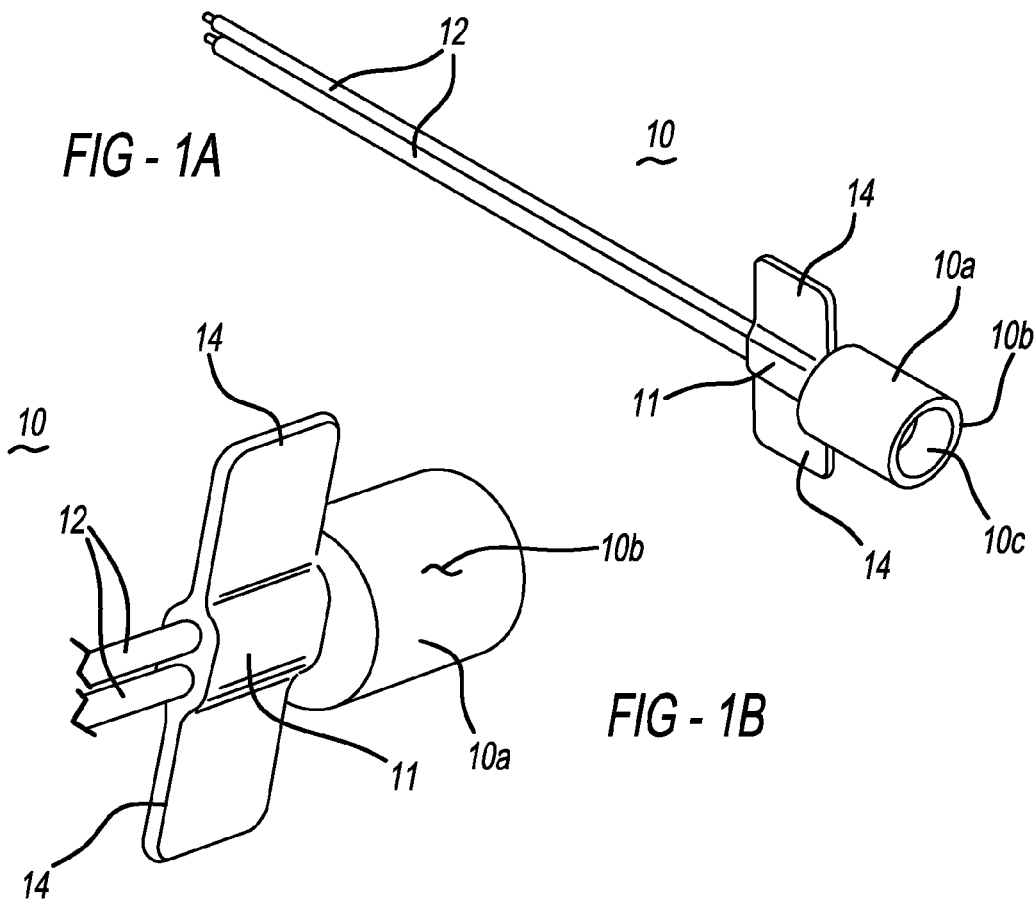
FIG - 1A
FIG - 1B
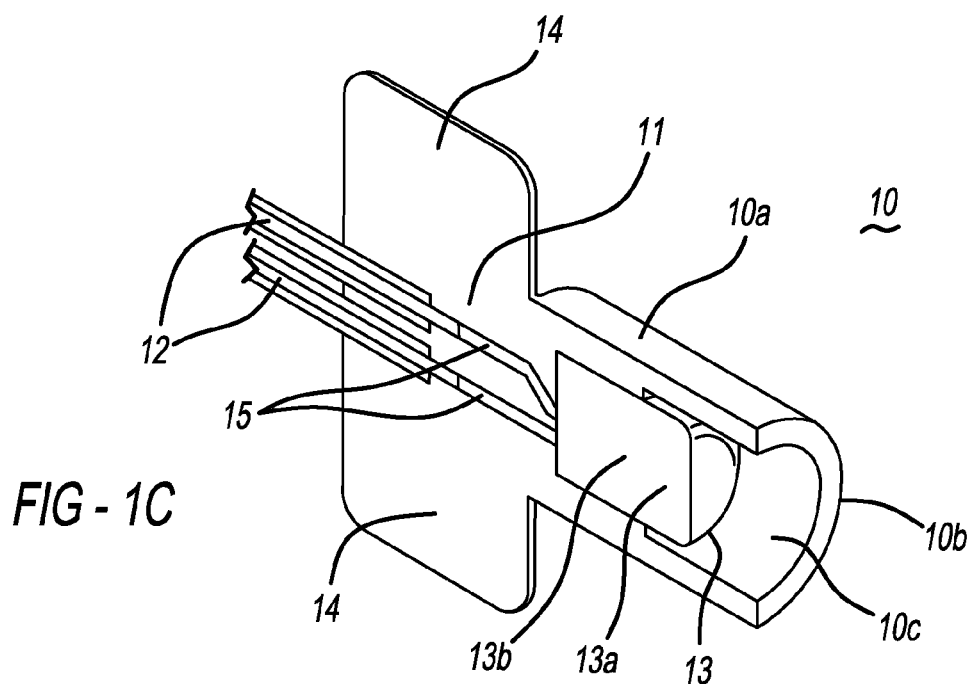
FIG - 1C

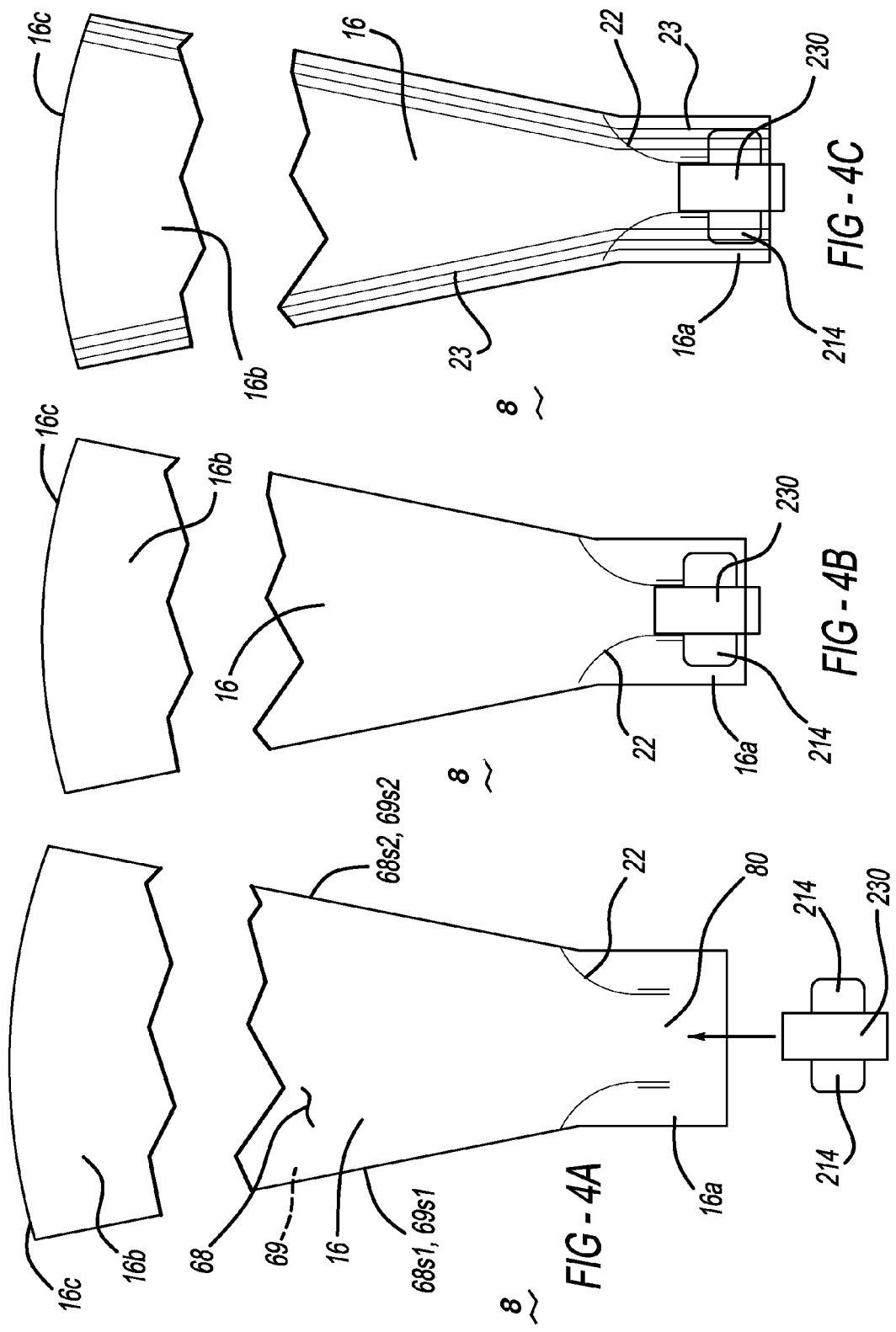

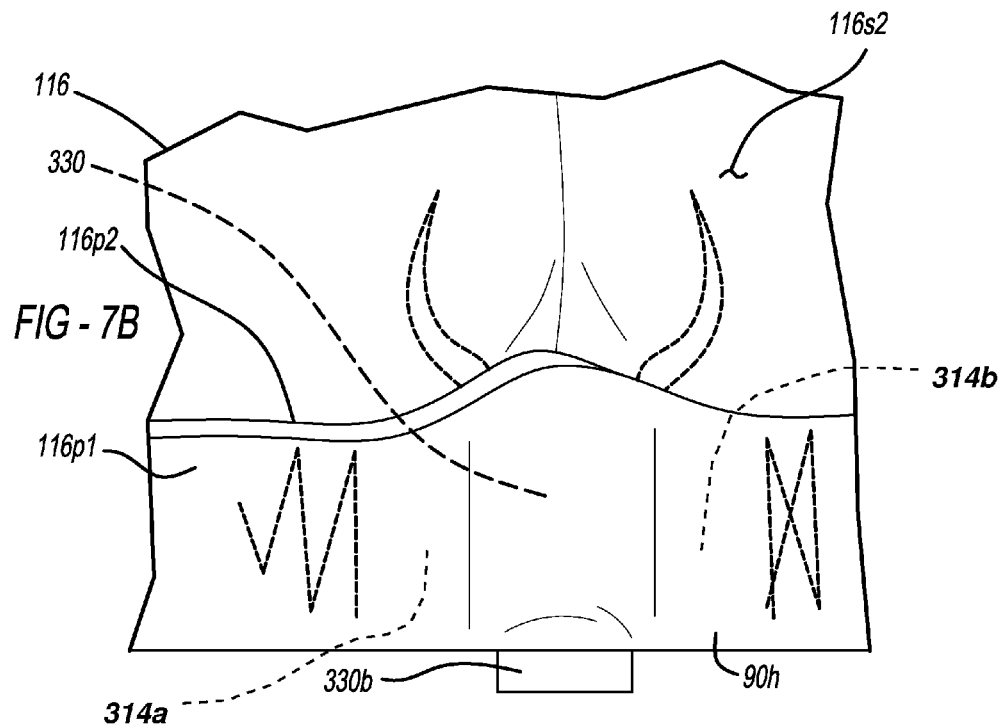
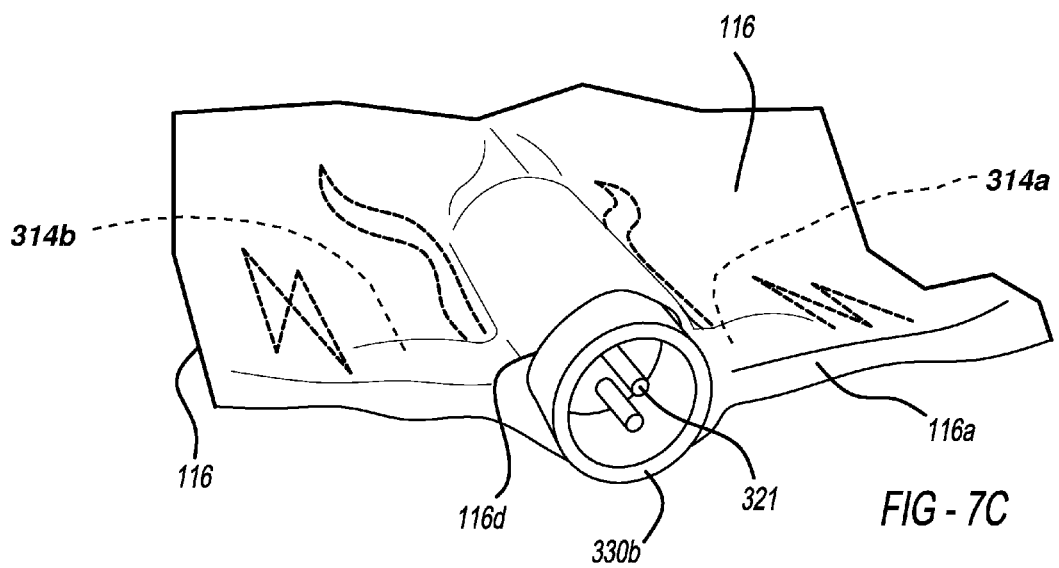

ACTIVE VENT ACTUATION SYSTEM

CROSS-REFERENCE TO RELATED APPLICATIONS

This application claims the benefit of U.S. Provisional Application Ser. No. 62/043,917, filed on Aug. 29, 2014 the disclosure of which is incorporated herein by reference in its entirety.

BACKGROUND OF THE INVENTION

The embodiments described herein relates to an airbag containing an active vent, and to systems for actuating or opening an active airbag vent.

As known in the art, active vent technology relates to the opening of a vent on an airbag at a predetermined time or under predetermined conditions (for example, when the pressure inside the airbag reaches a certain level). The vent remains in a closed condition until actively opened. This may be accomplished by an actuatable device that provides the necessary energy to open the vent.

SUMMARY OF THE INVENTION

In one aspect of the embodiments described herein, an airbag system is provided. The system includes an airbag having a vent hole formed therein, an actuator operatively coupled to the airbag, and a vent hole cover operatively coupled to the airbag so as to cover the vent hole and so as to form an enclosure extending between the actuator and the vent hole.

In another aspect of the embodiments of the described herein, an airbag system is provided. The system includes an airbag including a vent opening formed in a wall of the airbag, and an actuator operatively coupled to the airbag. A vent cover is operatively coupled to the airbag so as to form an enclosure extending between the actuator and the vent opening. The vent cover is secured to the airbag wall by a frangible securement means so as to cover the opening. The actuator is structured to pressurize the enclosure so as to disable the frangible securement means upon activation of the actuator.

In another aspect of the embodiments of the described herein, a system for actuating an airbag vent is provided. The system includes an actuator structured to generate a quantity of pressurized fluid upon activation of the actuator. A vent hole cover is structured to be operatively coupled to an airbag so as to cover a vent hole formed in the airbag, and so as to form a gas flow passage extending between the actuator and the vent hole.

BRIEF DESCRIPTION OF THE DRAWINGS

FIG. 1A is a perspective view of an active vent actuator in accordance with one embodiment described herein.

FIG. 1B is another perspective view of the vent actuator shown in FIG. 1A.

FIG. 1C is a cross-sectional perspective view of the vent actuator shown in FIGS. 1A and 1B.

FIG. 4A is a schematic plan view of a portion of an embodiment of a hollow, generally longitudinal vent hole cover in accordance with an embodiment described herein, and prior to attachment of the vent cover to a vent actuator.

FIG. 4B is the schematic plan view FIG. 4A showing the vent cover after insertion of an actuator into the vent cover.

FIG. 4C is the schematic plan view FIG. 4B showing the vent cover after attachment of the actuator to the vent cover, thereby forming an embodiment of an active vent actuation system.

FIGS. 7A-7F are views showing attachment of one embodiment of a vent actuator to an embodiment of a vent cover to form another embodiment of an active vent actuation system.

DETAILED DESCRIPTION

Figure 2A:
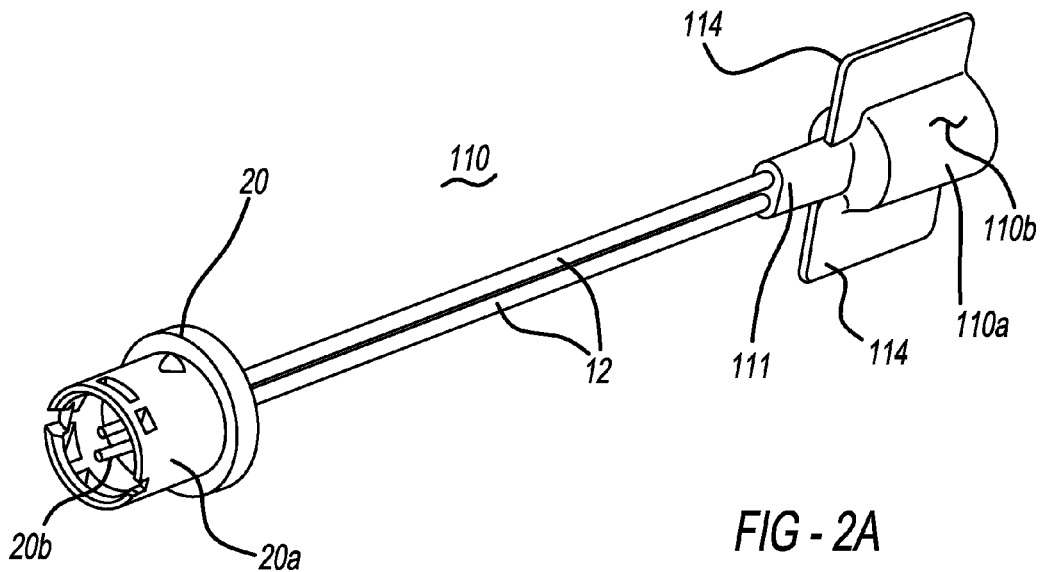
FIG. 2A is a perspective view of an active vent actuator in accordance with another embodiment described herein, with activation terminals of the actuator 110 electrically connected to a connector.

Like reference numerals refer to like parts throughout the description of several views of the drawings.

Embodiments are described herein with reference to the drawings. One of ordinary skill in the art will appreciate the various aspects of airbag design, construction and operation applicable to the embodiments of the present invention described herein. U.S. Pat. Nos. 6,886,857, 7,857,347, 8,128,124, and 8,322,748, for example, describe many such aspects and are each incorporated herein by reference in their entirety, but not by way of limitation. Furthermore, one of ordinary skill in the art will appreciate the known aspects of active vent technology as exemplified in U.S. Pat. Nos. 8,746,736, 8,590,927, 8,491,004, 7,874,533, and 7,681,914, each herein incorporated by reference in their entirety, but again not by way of limitation.

FIGS. 1A-1C are perspective views of an active vent actuator 10 in accordance with one embodiment described herein. Vent actuator 10 is structured for incorporation into an active vent actuation system 8, which maintains an active, supplemental airbag vent opening 24 (not shown in FIGS. 1A-1C) in a closed or sealed condition prior to activation of the vent actuation system. The active vent 24 is openable by pressurized fluid generated by activation of the vent actuation system, in a manner described herein. The active vent is actuated by ensuring that the vent is in an open condition (thereby enabling the venting of fill gas from the airbag interior) and by ensuring that the vent is accessible by the fill gas (i.e., that the fill gas is able to reach and exit the open vent).

In the embodiment shown in FIGS. 1A-1C, vent actuator 10 has a pressurized fluid source 13 contained within a housing 10$a$. Housing 10$a$ has a wall 10$b$ defining a housing interior enclosing the pressurized fluid source 13. Wall 10$b$ also defines an opening 10$c$ providing an exit for pressurized fluid from the housing interior. A base portion 11 extends from a rear portion of housing wall 10$b$. In the embodiment shown, base 11 encapsulates and serves as a strain relief for the joints electrically connecting electrical conductors 12 (for example, wires) to fluid source activation terminals 15. Wires 12 may be electrically connected to fluid source activation terminals 15 in any suitable manner, for example, by soldering or resistance welding. Base 11 may be molded or otherwise formed integrally with housing 10$a$. Alternatively, the base may be formed separately and attached to housing 10$a$ using adhesives or any other suitable method. In addition, the length of housing wall 10$b$ may either be increased to provide a correspondingly more focused, directional initial flow of pressurized gases from the housing, or decreased to provide a correspondingly more diffuse or widely spread initial flow of gases emanating from the housing opening 10$c$.

A support structure is operatively coupled to the base 11 and/or housing 10$a$ to enable the actuator housing to be secured to the vent cover so as to form a gas-tight seal between the vent cover and the actuator housing. In FIGS. 1A-1C, the support structure is in the form of a pair of tab portions 14 extending from opposite sides of the base 11. In a manner described herein, tabs 14 aid in securing the housing 10$a$ to a desired location on the airbag. Tabs 14 may be sized, shaped and otherwise configured as desired, according to the requirements of a particular application. Although a pair of tabs are shown projecting from the base portion of the housing, any desired number of tabs may be used. In a particular embodiment, a single tab is used.

In one embodiment, tabs 14 are formed from a material and have a structure that is sewable (i.e., formed from a layer of material such as high density polyethylene (HDPE) which can be directly stitched to the material of a fabric vent hole cover member 16 (as shown in FIGS. 4A-4C) and/or to the material of an airbag). The tab material may be insert moldable into the material of base 11 and/or housing 10$a$ as these elements are molded. In a particular embodiment, the tabs 14 are made of airbag fabric and then insert molded into the material of base and/or housing 10$a$ as stated above. Alternatively, tabs 14 may be formed from a relatively rigid polymer, which may also be used to form housing 10$a$ and/or base 11 when the housing, base and tabs are integrally molded as a single part.

In one alternative embodiment, the actuator housing tabs are stitched directly to the airbag during fabrication of the airbag, using a portion of the stitching employed in joining together the seams of the constituent fabric portions of the airbag.

In the embodiment shown in FIGS. 1A-1C, for example, the housing 10$a$, base 11, and tabs 14 are integrally overmolded over the fluid source 13 and the joints electrically connecting the wires 12 to the terminals 15, using a polymeric or other suitable material. Alternatively, and as stated previously, the housing 10$a$, base 11, and tabs 14 may be formed separately and joined together using any suitable method (for example, adhesive attachment, overmolding, etc.).

The particular type of pressurized fluid source 13 used for the purposes described herein may be dependent on the requirements of a particular application. In one embodiment, where a relatively smaller amount of pressurized fluid is suitable for the application, the fluid source 13 may be in the form of a known or suitable squib, for example, which generates a relatively small amount of pressurized fluid in the form of pressurized gas. This may be used, for example, in an application where the pressurized fluid source is positionable in relatively close proximity to the openable vent 24, and where the internal volume of the vent cover is consequently relatively small.

In other embodiments, it may be necessary to position the pressurized fluid source relatively farther away from the supplemental vent hole 24. In such cases, the internal volume of the vent cover will be relatively greater due to the increased length of the vent cover between the actuator housing and the end of the vent cover sealing the vent hole. In this case, a relatively larger amount of pressurized fluid is required to inflate the cover to open the vent, and the pressurized fluid source 13 may be in the form of a known or suitable micro gas generator (MGG), which is configured to generate a relatively greater quantity of pressurized fluid.

Using the vent cover structure and actuator attachment methods described herein, the distance between the actuator and the active vent may be minimized according to the requirements of a particular application. This enables minimization of the vent cover internal volume, which enables minimization of the amount of pyrotechnic or gas generant required for inflating the vent cover the opening the active vent.

In the embodiment shown in FIGS. 1A-1C, fluid source 13 is an MGG having a quantity of pyrotechnic or gas generant material 13$a$ and an initiator 13$b$ operatively coupled to the pyrotechnic or gas generant material for initiating combustion of the material 13$a$. A pair of activation terminals 15 extend from the initiator 13$b$. The fluid source 13 is activated by an activation signal transmitted to the initiator terminals 15 via wires 12 connected to terminals 15, resulting in ignition of the pyrotechnic or gas generant material 13$a$ in a known manner.

Embodiments of the pressurized fluid source include one or more fluid source activation terminals 15 extending therefrom. Terminals 15 enable electrical coupling to a fluid source activation signal source or transmission medium from which an actuator activation signal is transmitted to the actuator.

Figure 8A:
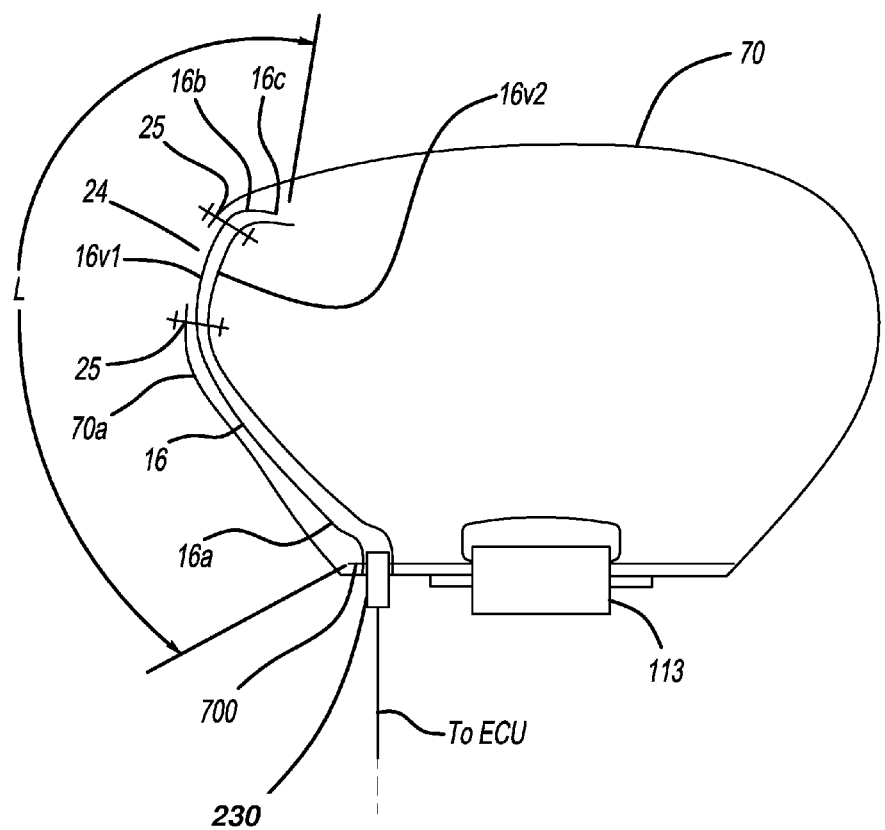
FIG. 8A shows a schematic cross-sectional front view of an inflated airbag incorporating an active vent actuation system in accordance with an embodiment described herein, operatively coupled to the airbag.

Ends of the wires 12 opposite the ends connected to the housing 10$a$ may be connected to any desired activation signal source or transmission medium. For example, in the embodiment shown in FIGS. 2A-2B, wires 12 are connected to a signal transmission medium in the form of an electrical connector 20. In embodiments described herein, connector 20 has a housing 20a and a plurality of terminals 20b structured to connect to a control module, electronic control unit (ECU) or other activation signal transmission source. As known in the pertinent art, the connector terminals 20b are typically connected to a female receiving portion (not shown) located on an airbag module housing or reaction can (for example, element 700 as shown in FIG. 8A). Alternatively, the female receiving portion may be electrically coupled to an ECU (not shown).

Figure 2B:
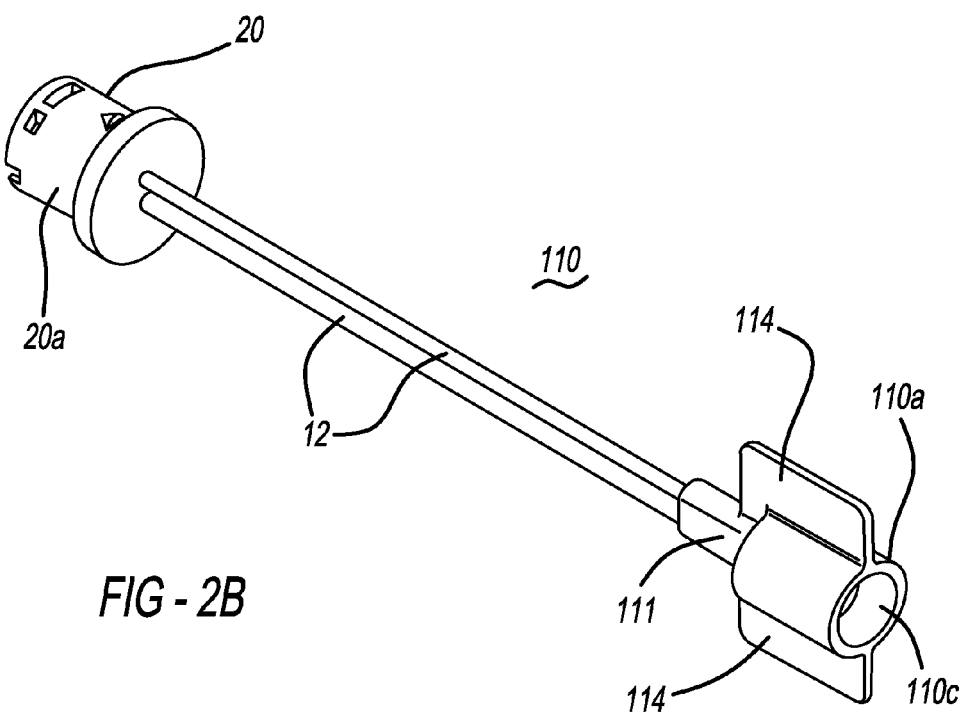
FIG. 2B is another perspective view of the vent actuator shown in FIG. 2A.

FIGS. 2A and 2B are perspective views showing an embodiment 110 of a vent actuator similar to the embodiment shown in FIGS. 1A-1C. In this embodiment, activation terminals 15 of the actuator 110 are electrically connected to a connector 20 as previously described. Tabs 114 are attached directly to a portion the housing 110a and extend from both the housing 110a and the base 111. This arrangement enables the housing 110a to be secured to the airbag (using tabs 114) at a location closer to housing opening 110c, while also increasing the rigidity of the housing 110a. In this manner, the location of the housing opening 110c with respect to the attachment location of the housing 110a to the airbag may be adjusted to a certain degree, as desired.

Figure 3A:
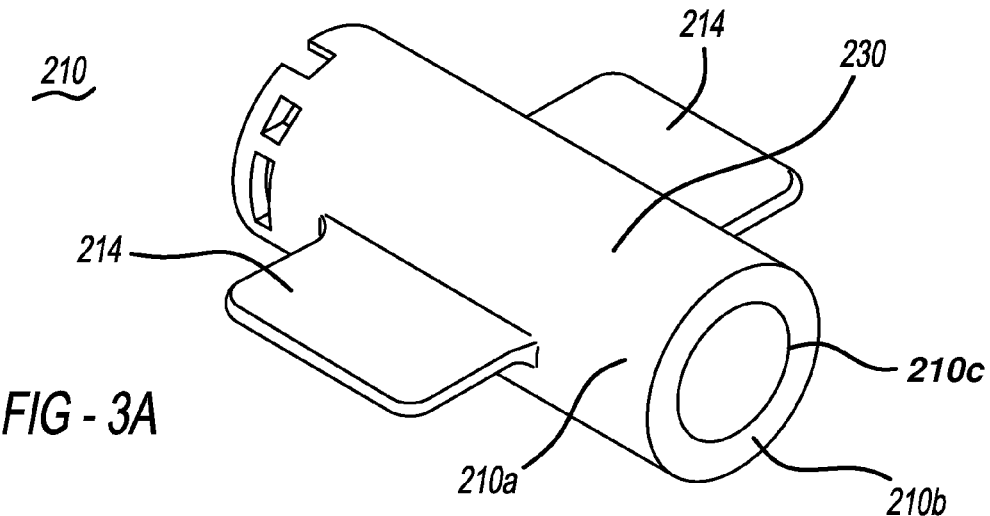
FIG. 3A is a perspective view of an active vent actuator in accordance with another embodiment described herein, with a connector housing integrally formed as a single piece with a vent actuator housing.
Figure 3B:
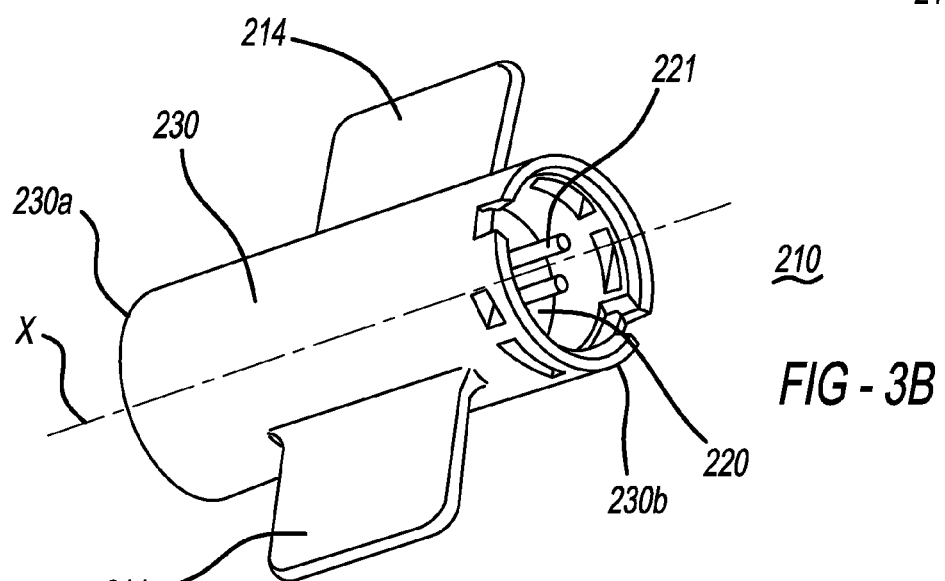
FIG. 3B is another perspective view of the vent actuator shown in FIG. 3A.
Figure 3C:
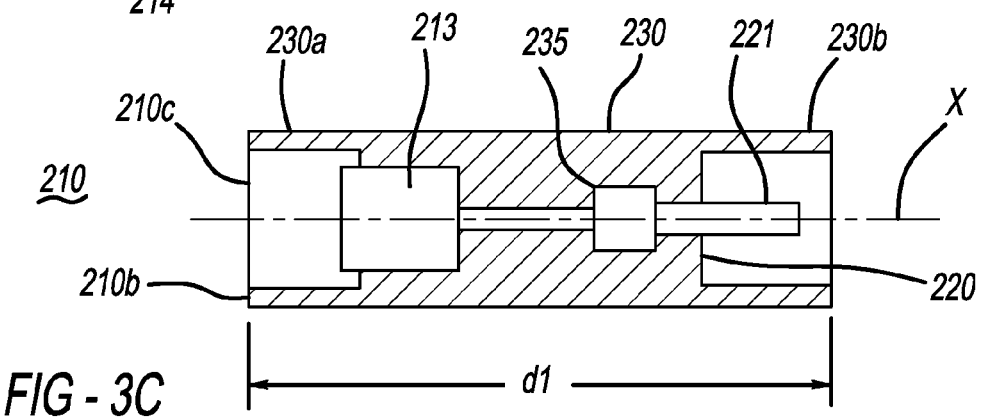
FIG. 3C is a schematic cross-sectional view of the vent actuator shown in FIGS. 3A and 3B.

FIGS. 3A-3C show perspective views of another embodiment 210 of the vent actuator. In this embodiment, the connector housing is integrally molded or otherwise formed as a single piece with the vent actuator housing to form a combined housing 230 having a longitudinal axis X and containing the pressurized fluid source 213 and the connector 220. FIG. 3C shows a cross-sectional view of the combined housing 230 and its contents. A wall 210b encloses the pressurized fluid source 213 and defines an opening 210c enabling pressurized fluid flow from an interior of the housing as previously described. Tabs 214 extend from opposite sides of the combined housing 230. Connector terminals 221 are electrically connected to the pressurized fluid source 213 at a junction 235 within the housing 230 which may be overmolded within the housing during housing fabrication.

In addition, the dimensions and internal configuration of the housing 230 (for example, the spacing dl between the ends 230a and 230b of the housing 230) and the positions of the tabs 214 along the housing exterior may be controlled in the mold to achieve a desired spatial relationship between the tabs 214 (which are used to attach the vent actuator to the airbag) and the connector terminals 221, between the tabs 214 and the pressurized fluid source 213 and/or fluid source opening 210c, and/or between the connector terminals 221 and the pressurized fluid source 213 and/or pressurized fluid source opening 210c. This enables flexible positioning of the locations of the connector terminals 221, the pressurized fluid source 213 and/or pressurized fluid source opening 210c, and the tabs 214 with respect to each other. In this embodiment, a pigtail harness may be required to connect the connector terminals 221 to the module housing or electronic control unit (ECU) (not shown). This embodiment provides an option for applications where it is not necessary or desirable to position the vent actuator housing spaced apart from the connector, as seen in the previous embodiments.

The various embodiments of the vent hole cover described herein, when attached to a wall of the airbag, form gas flow passages or gas-tight enclosures separate from the remainder of the airbag interior. These gas flow passages enable fluid communication between an actuator supplying a quantity of pressurized gas, and a portion of the cover secured to a wall of the airbag so as to cover the vent hole. The cover is secured to the airbag wall using a frangible securement means. An increase in gas pressure within the gas flow passage produces rupture of the frangible securement means, enabling the cover to be forced away from the vent hole. This opens the vent hole to fill gas from portion of airbag interior exterior of the gas flow passage FIGS. 4A-4C show schematic views of a portion of an embodiment of a hollow, inflatable, generally longitudinal vent hole cover 16 attached to an embodiment 230 of an actuator housing described herein, thereby forming an active vent actuation system 8. In the embodiment shown in FIGS. 4A-4C, the vent hole cover 16 is in the form of an enclosure or inflatable member which provides a gas flow passage extending between the vent cover actuator housing and a vent hole formed in the airbag. In this embodiment, the vent cover 16 has a first end 16a and a second end 16b opposite the first end. Cover first end 16a is stitched or otherwise suitably attached to the actuator housing 230. The cover 16 is structured to be stitched or otherwise attached to the airbag proximate cover second end 16b so as to cover a supplemental active vent hole 24 (not shown in FIGS. 4A-4C) formed in the airbag.

Vent hole cover 16 may be formed from the same fabric as the body of the airbag, for example. Alternatively, the vent hole cover may be formed from any material suitable for the purposes described herein. In one particular embodiment, the vent hole cover 16 is structured to have the shape of a funnel when the cover is expanded or inflated by a flow of pressurized gas therealong. In another particular embodiment, the vent hole cover is structured to have a generally-tubular shape when inflated. However, the vent hole cover may be structured to have any desired inflated configuration, according to the requirements of a particular application.

The vent hole cover 16 may be formed in any of a variety of ways. For example, the cover may be formed by folding over opposite edges of a single panel of airbag fabric material so that the edges meet and/or overlap, and then securing the edges together using stitching or other suitable means so as seal the seam extending along a longitudinal dimension of the cover. Alternatively, the cover may be formed two or more pieces of material joined together along edges thereof. The internal volume of the hollow cover then defines a fluid flow passage structured to channel a flow of pressurized fluid between the first end 16a and the second end 16b of the cover.

Figure 4D:
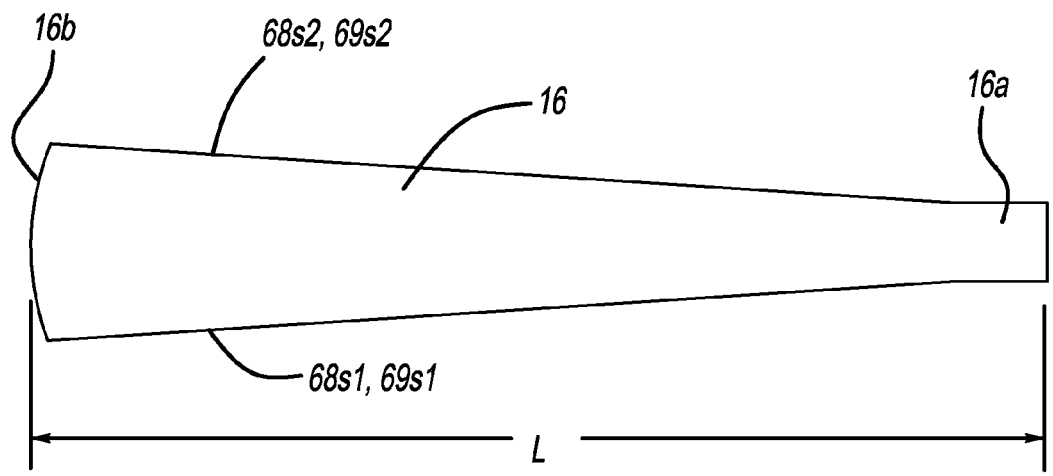
FIG. 4D is a plan view of the vent cover of FIGS. 4A-4C laid out on a flat surface.

FIG. 4D shows a vent cover embodiment in accordance with FIGS. 4A-4C laid out on a flat surface. FIG. 8A shows the vent cover embodiment of FIG. 4D incorporated into an airbag, with the airbag in an inflated condition. Referring to FIGS. 4D and 8A, an embodiment of a vent cover described herein may have any desired overall length L, according to the requirements of a particular application. Either during or after formation of the cover, the cover may be attached to an actuator housing (such as housing 230) as described herein, so that gases generated by the gas source flow along the length of the cover interior and expand the cover.

FIGS. 4A-4C also show a sequence of stitching or attachment of a particular embodiment of the cover member 16 to one of the actuator housings shown in the previously described embodiments. For purposes of the following description, FIGS. 4A-4C show attachment of the housing 230 shown in FIGS. 3A-3B to the vent cover, although the description is also applicable to attachment between the vent cover 16 and any other embodiment of the actuator housing described herein.

In the embodiment shown in FIGS. 4A-4C, cover member 16 is formed from a pair of similarly-shaped first and second airbag fabric pieces 68 and 69 which are stacked so that each side edge of the first piece 68 rests atop a corresponding side edge of the second piece 69. Thus, side edge 68$s$1 of piece 68 rests atop side edge 69$s$1 of piece 69, and side edge 68$s$2 of piece 68 rests atop side edge 69$s$2 of piece 69. The cover member pieces shown are cut such that the cover interior is in the shape of a funnel when inflated, as previously described.

In addition, portions of the cover first end 16$a$ are stitched (as indicated by stitch lines 22) or otherwise attached to each other so as to form a pocket or restriction 80 sized to provide a snug fit with the end 230$a$ of the actuator housing 230 containing the pressurized fluid source opening. This snug fit provides an effective gas seal between the vent cover 16 and the vent actuator housing 230 during operation of the actuator.

FIG. 4A shows a portion of the cover first end 16$a$ prior to insertion of the vent actuator housing 230 into the vent cover. In FIG. 4B, the portion of the vent actuator housing 230 containing the pressurized fluid source opening has been inserted into restriction 80. Then, the stacked or overlapping side edges 68$s$1, 69$s$1 and 68$s$2, 69$s$2 are stitched together along stitch lines 23 as shown to define the hollow interior of the vent cover. Depending on the material from which housing tabs 214 are formed, the stitching 23 may penetrate the tabs 214, thereby securing the tab in position between the vent cover sheets 68 and 69. Alternatively, the stitching may extend around and outside the edges of the tabs as shown in FIGS. 7A-7F (described below). In addition, the edge 16$c$ of cover end 16$b$ is left unsealed or open.

In the embodiments described herein, the stitching or other attachment between the vent cover pieces 68 and 69 at cover first end 16$a$ acts to secure the actuator housing 230 in position proximate the first end 16$a$ of the vent cover, and also forms a gas seal at the cover first end 16$a$ between the pieces 68 and 69 and between the cover 16 and the actuator housing 230. Further, as shown in the example, the side edge stitching 23 may cross the stitching 22 forming the pocket 80.

Figure 6:
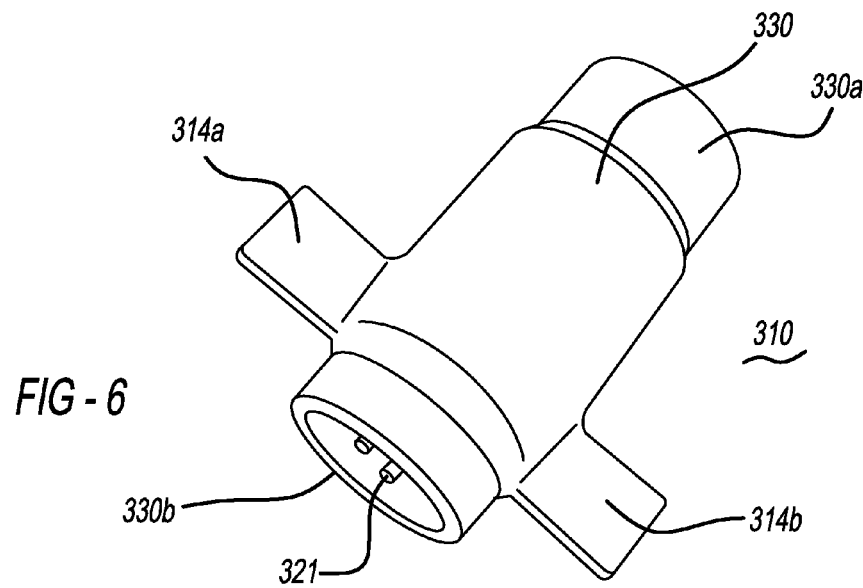
FIG. 6 is a perspective view of an active vent actuator in accordance with another embodiment described herein, with a connector housing integrally formed as a single piece with a vent actuator housing.

FIG. 6 is a perspective view of an active vent actuator in accordance with another embodiment described herein, with a connector housing integrally formed as a single piece with a vent actuator housing. FIGS. 7A-7F show schematic views of a portion of another embodiment of a hollow, generally longitudinal vent hole cover 116 attached to actuator housing embodiment 330 of FIG. 6 which is similar to the actuator housing 230 previously described. In the embodiment shown in FIGS. 7A-7F, for purposes of the description, only the portion the vent cover 116 proximate cover first end 116$a$ is shown. Thus, the full length of the cover 116 is not represented in FIGS. 7A-7F.

In the embodiment shown in FIGS. 7A-7F, the vent hole cover 116 has a first end 116$a$ and a second end 116$b$ (not shown) opposite the first end. In addition, the edge 116$c$ (not shown) of cover end 116$b$ is left unsealed or open, as in the embodiment shown in FIGS. 4A-4C. Cover first end 116$a$ is stitched or otherwise suitably attached to the actuator housing. The cover is also structured to be stitched or otherwise attached to the airbag proximate cover second end 116$b$ so as to cover a supplemental active vent hole 24 formed in the airbag. In the embodiment shown in FIGS. 7A-7F, the vent cover is formed from two layers or sheets 116$s$1 and 116$s$2 of vent cover material.

Figure 7A:
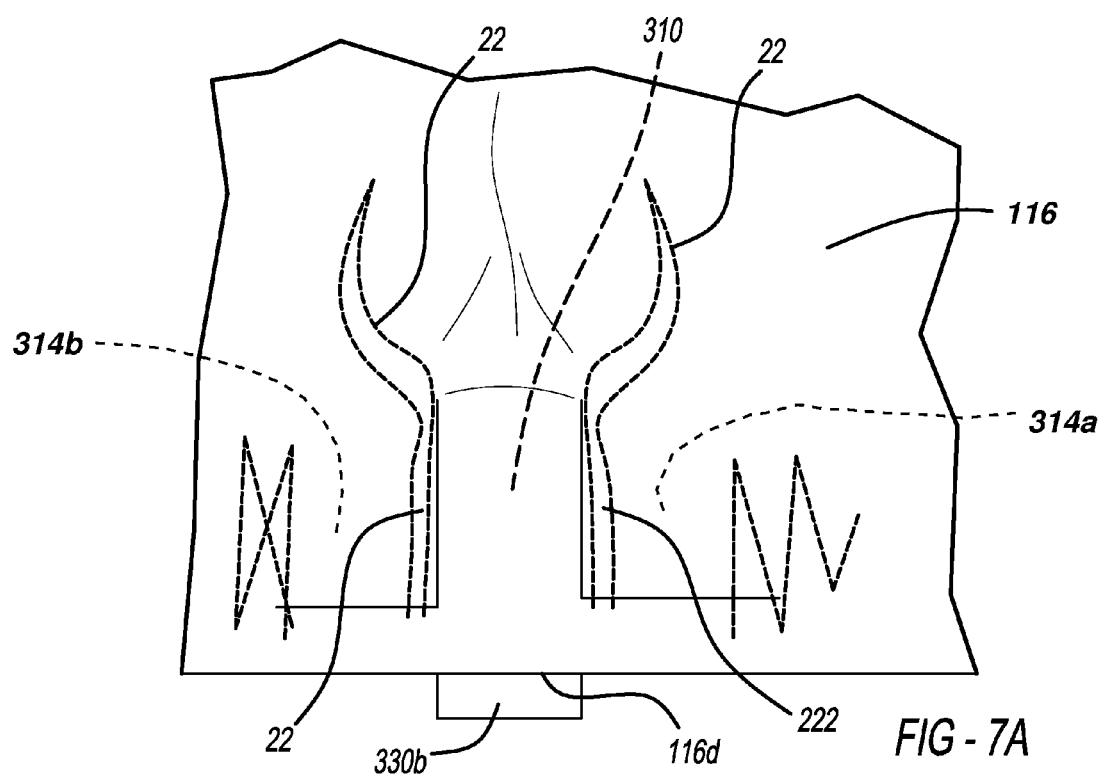
Figure 7D:
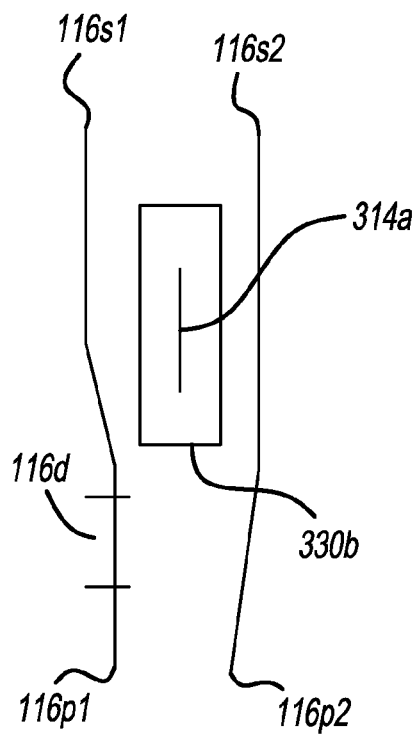
Figure 7E:
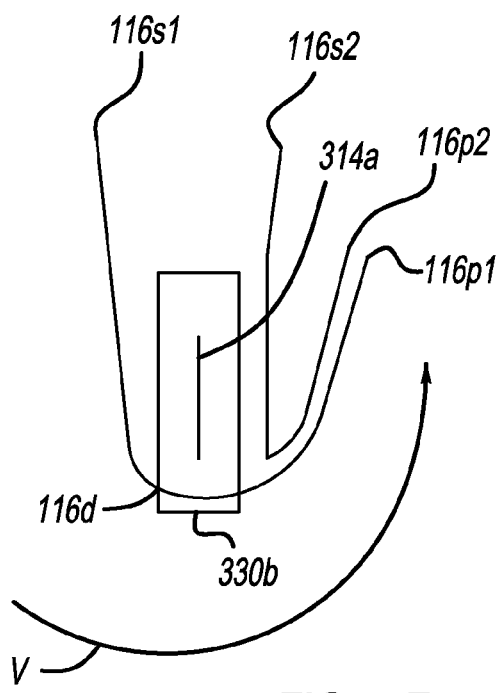
Figure 7F:
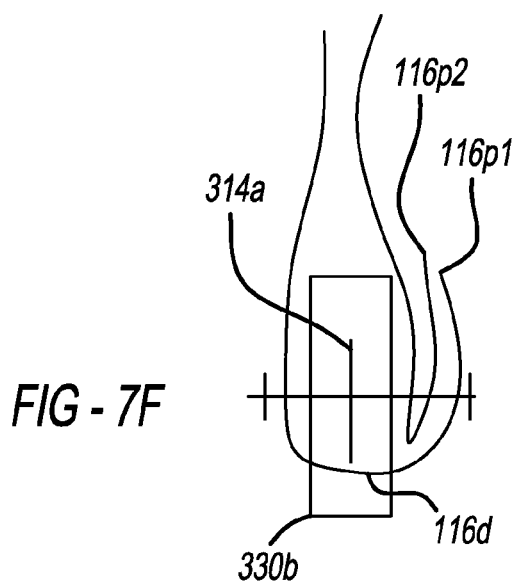

To attach the cover 116 to the housing 330, an opening 116$d$ is cut or otherwise formed through a sheet 116$s$1. The housing 330 is then placed between layers 116$s$1 and 116$s$2 such that a gas exit end 330$a$ of the housing is positioned within the vent cover and the end 330$b$ of the housing containing the connector terminals 321 is positioned proximate the opening 116$d$ (FIG. 7D). FIGS. 7D-7F show cross-sectional side views of the housing 330 positioned between adjacent layers 116$s$1 and 116$s$2. An end 116$p$1 of layer 116$s$1 containing the opening 116$d$ is folded toward the connector end 330$b$ of the housing (as shown in FIG. 7E) until the connector end of the housing extends through the opening 116$d$ as shown in FIGS. 7A-C, 7E and 7F. Also, an end 116$p$2 of layer 116$s$2 adjacent housing end 330$b$ is folded back on the remainder of layer 116$s$2 as shown in FIG. 7E in conjunction with the folding of end 116$p$1, until the ends of folded layers 116$s$1 and 116$s$2 overlap the housing 330 as shown in FIG. 7F, thereby forming a pocket between the layers in which the housing may be secured. The folded, overlapping layers of vent cover material may then be stitched or otherwise attached to each other along and outside the periphery of the tabs 314$a$ and 314$b$ (by stitches 222, for example), as shown in FIGS. 7A-7C. Alternatively, the stitches 222 may extend through the tabs 314$a$ and 314$b$ as previously described.

In this configuration, tabs 314$a$ and 314$b$ reside between the overlapping folded layers 116$s$1 and 116$s$2 of the vent cover material. This structure effectively seals the housing/vent cover interface for purposes of inflating the vent cover as described herein. In the manner just described, the combined housing 330 (or a pressurized gas source housing in accordance with one of the other embodiments described herein) may be secured to the vent cover prior to attachment of the vent cover to the airbag. Attachment of an embodiment of the actuator housing to an embodiment of the vent cover forms an associated embodiment the active vent actuation system. This actuation system may be attached to an airbag so as to cover and seal a supplemental vent hole formed in the airbag wall, as described herein.

Figure 8B:
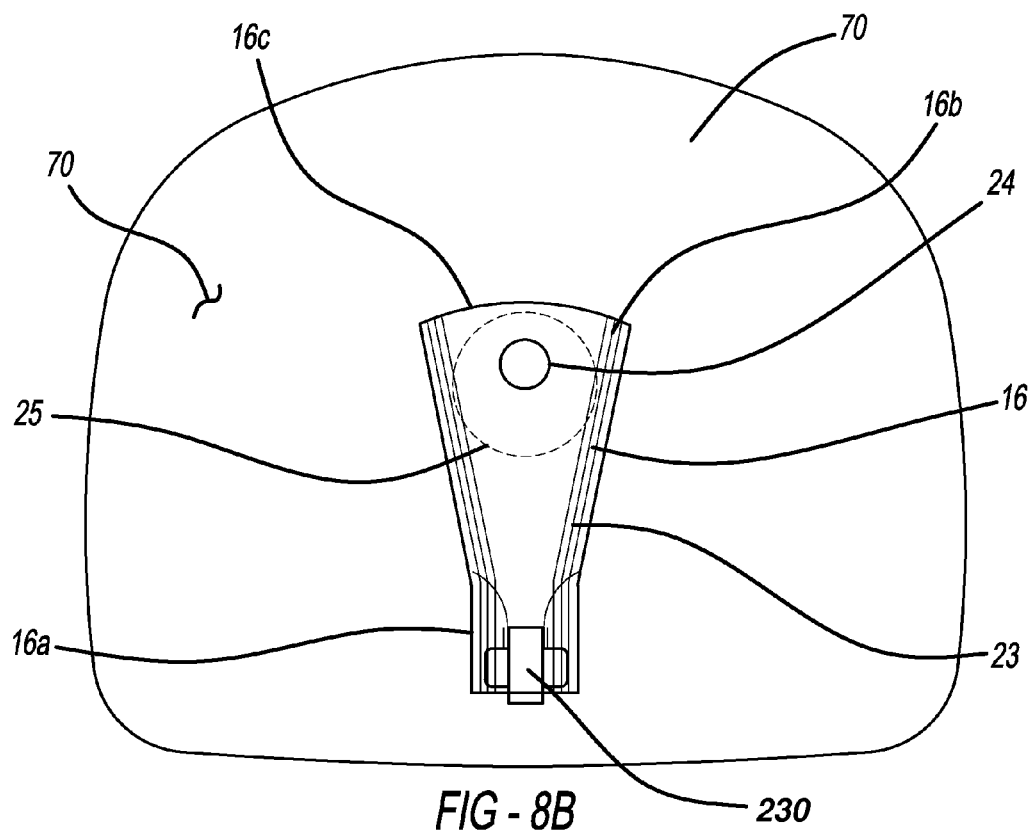
FIG. 8B shows a schematic cross-sectional side view of the airbag shown in FIG. 8A.

FIG. 8A shows a schematic cross-sectional front view of an inflated airbag 70 incorporating an active vent actuation system operatively coupled to the airbag 70 such that a vent cover 16 covers and seals a supplemental vent hole 24 formed in the airbag. The length L of the vent cover is the overall length the cover would have if laid out on a flat surface, as shown in FIG. 4D. FIG. 8A shows the airbag 70 prior to activation of the vent actuation system. FIG. 8B shows a schematic cross-sectional side view of the airbag shown in FIG. 8A. For purposes of description, the vent cover 16 and actuator housing 230 shown in FIGS. 8A and 8B are the embodiments shown in FIGS. 4A-4C. However, other embodiments of the vent cover may be attached to the airbag in a manner similar to that described herein.

Referring to FIG. 8A, the pressurized fluid source housing 230 may be mounted on the same structure (for example, reaction can 700) as the inflator 113 which generates fill gas for the airbag 70. Alternatively, housing 230 may be mounted to any other suitable portion of an airbag module or to a portion of the vehicle on which the airbag is mounted. The connector end of the housing 230 is electrically connected to an activation signal source (for example, an electronic control unit (ECU) (not shown)).

Referring to FIGS. 8A and 8B, to attach the vent cover 16 to the airbag, a portion of one side 16$v$1 of the cover 16 residing proximate cover second end 16*b* is positioned so as to overlap and cover the vent opening 24. Then, the side 16*v*2 of the cover opposite side 16*v*1 is flattened or pressed against cover side 16*v*1 and the opening 24, so as to effectively close the cover second end 16*b*. The vent cover 16 is attached to the airbag 70 along an interior surface 70*a* of the airbag wall by frangible securement means 25. As used herein, the term "frangible" means "readily or easily broken or disabled". The securement means is designed to be breakable or rupturable by inflation of the vent cover by the vent actuator, so that the vent cover becomes detachable from the airbag wall due to a flow of airbag inflation gas between the vent cover and the airbag wall and/or due to motion of the vent cover relative to the airbag wall, resulting from gas flow within the vent cover. In addition, in the embodiments described herein, any frangible securement means attaching an embodiment of a vent cover to an airbag wall is structured and/or positioned with respect to the vent cover and/or the airbag wall such that the frangible securement means will not rupture during normal deployment or filling of the airbag, but only as a result of activation of an embodiment of the vent actuator and the resulting pressurization of a gas flow passage leading from the actuator to the frangible securement means, as described herein. For example, frangible stitching attaching the vent cover to the airbag wall may be structured and positioned such that forces exerted by airbag fill gas on the vent cover during inflation and normal operation of the airbag will not appreciably stress the frangible stitching. However, the frangible stitching is structured and positioned to fail responsive to forces exerted on the vent cover due to inflation of the gas flow passage defined by the vent cover.

In one embodiment, the frangible securement means is in the form of readily-torn stitching or weakened stitching 25 sewn about the vent opening 24 and securing both of cover sides 16*v*1 and 16*v*2 against the airbag and overlapping the opening 24, thereby fixing the vent cover 16 over the vent opening 24 and sealing the vent opening 24. As seen in FIG. 8B, stitching 25 is structured to overlap side edge stitching 23 along both side edges of the vent cover, so that cover second end 16*b* is effectively closed by a combination of the stitching 25 and the stitching 23.

Figure 8C:
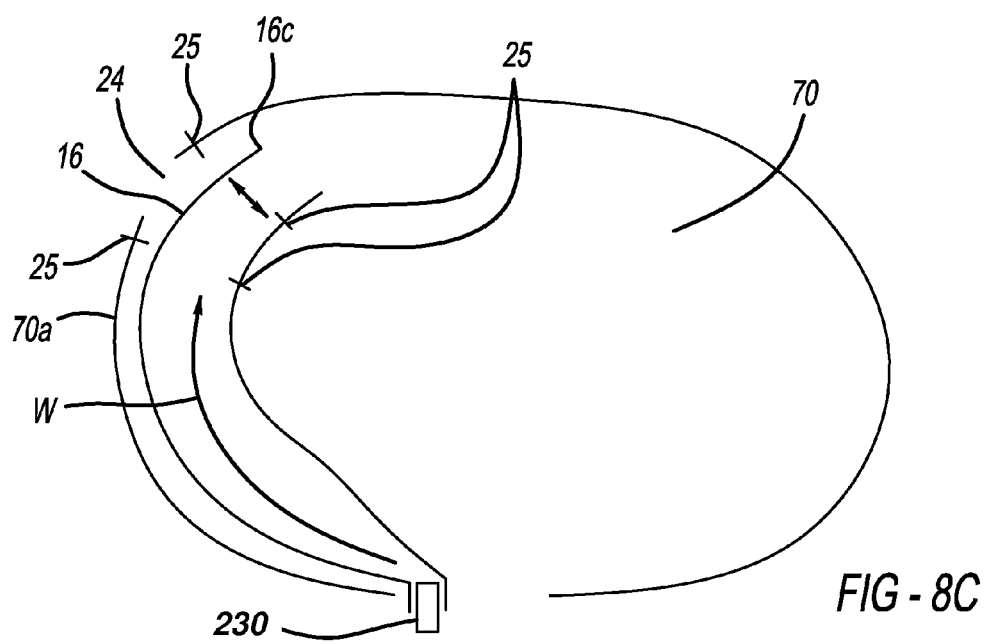
FIG. 8C shows the schematic cross-sectional front view of FIG. 8A immediately after rupture of a frangible securement means securing the vent cover over the vent opening.
Figure 8D:
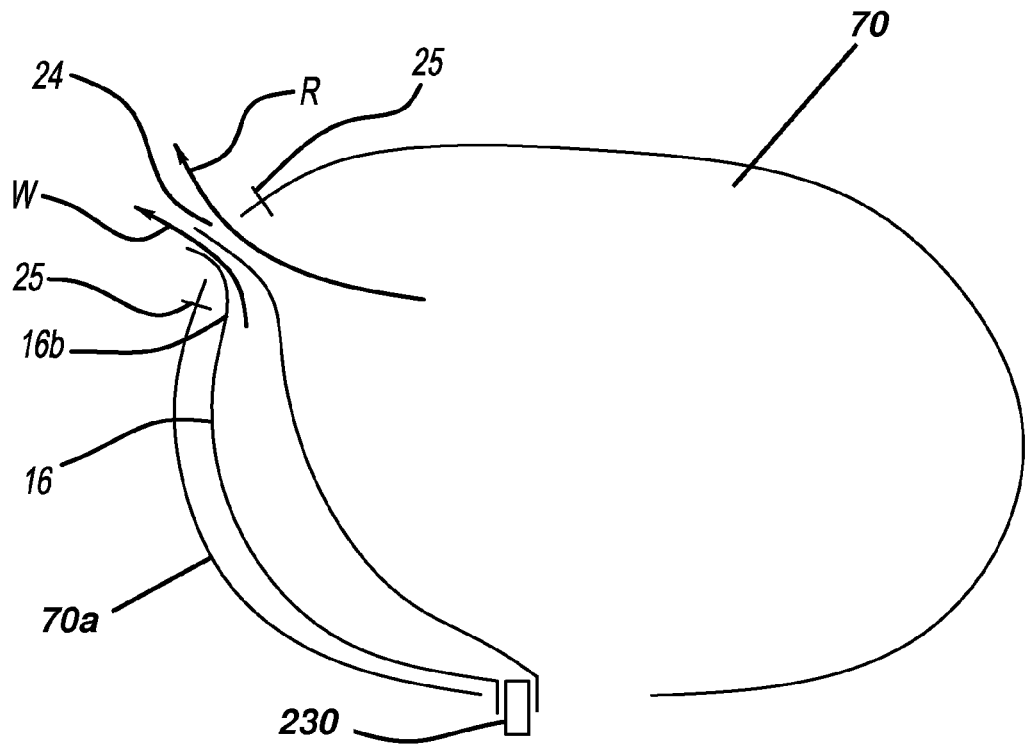
FIG. 8D shows the schematic cross-sectional front view of FIG. 8C during expulsion of airbag fill gas from the airbag interior.
Figure 8E:
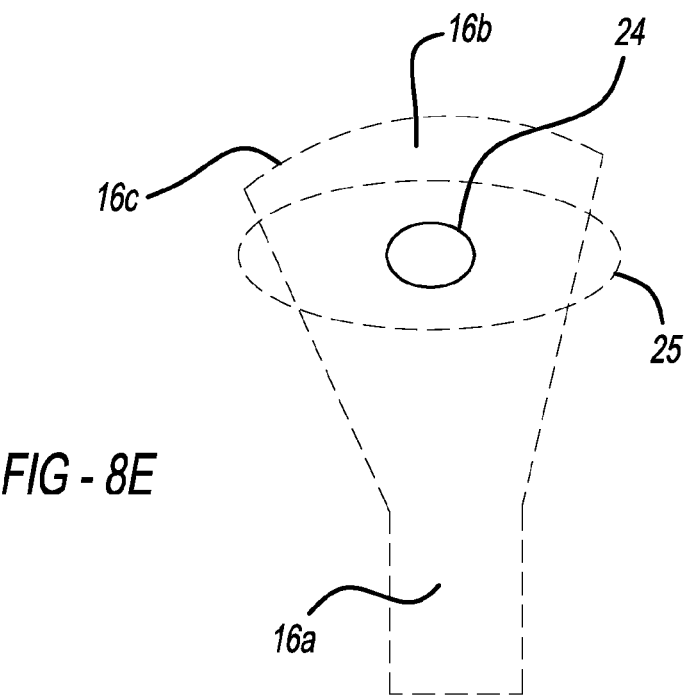
FIG. 8E shows an alternative embodiment of an attachment of a vent cover to an airbag wall.

In an embodiment of the vent cover which does not include stitching (such as stitching 23 in FIGS. 4A-4C) along lateral edges of the vent cover, the readily-torn stitching or weakened stitching 25 attaching the vent cover to the airbag may simply overlap the side edges of the vent cover as shown in FIG. 8E, thereby sealing the open end 16*b* of the vent cover 16 and attaching the vent cover 16 to the airbag 70 over the vent hole 24.

In another embodiment, the frangible securement means may be in the form of a suitable adhesive applied so as to secure vent cover to the airbag wall, and so as to join opposing walls of the vent cover, thereby closing the open end of the vent cover. Other frangible securement means may also be used.

FIGS. 8C and 8D show operation of the vent actuation system after the airbag 70 has been inflated.

If it is determined (based on vehicle sensor inputs to an ECU, for example) that venting of airbag 70 is required, the ECU sends a signal to the pressurized gas source. Upon receipt of an activation signal by the housing 230, the pressurized gas source activates to produce a quantity of pressurized inflation gas which is injected into the hollow vent cover 16 as indicated by arrow W, causing the vent cover to inflate along its length. Increasing pressure within the vent cover 16 causes the frangible securement means 25 to fail as shown in FIG. 8C, thereby disengaging the vent cover attachment to the airbag. Thus, in an embodiment using readily-torn stitching or weakened stitching, attachment or securement of the vent cover to the airbag wall is considered to be disabled when the readily-torn stitching or weakened stitching has been ruptured by inflation of the vent cover. This enables the fill gas within the airbag to flow between the vent cover and the vent opening 24 and out of the vent opening, thereby reducing the internal pressure of the airbag. Rupture of the frangible securement means also opens the vent cover second end 16*b*, releasing the pressurized gas within the vent cover. The second end 16*b* of the vent cover 16 may be expelled from the vent 24 during outflow of inflation gas from the airbag as indicated by arrow R, thereby releasing the remainder of the vent cover fill gas to the environment exterior of the airbag.

Figure 9A:
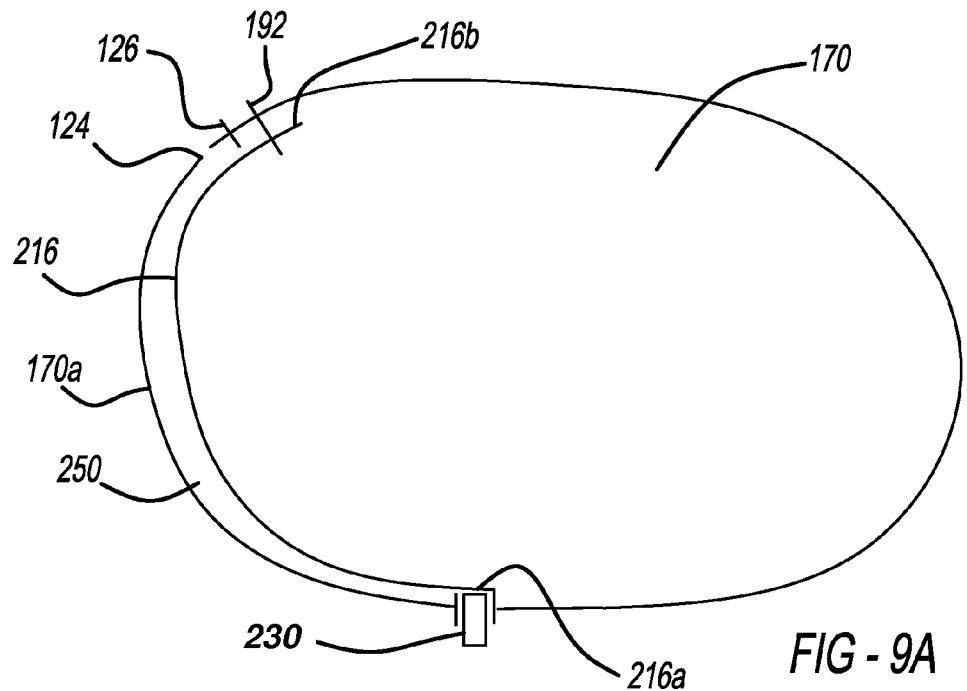
FIG. 9A shows a schematic cross-sectional front view of an inflated airbag incorporating an active vent actuation system in accordance with another embodiment described herein, operatively coupled to the airbag.
Figure 9B:
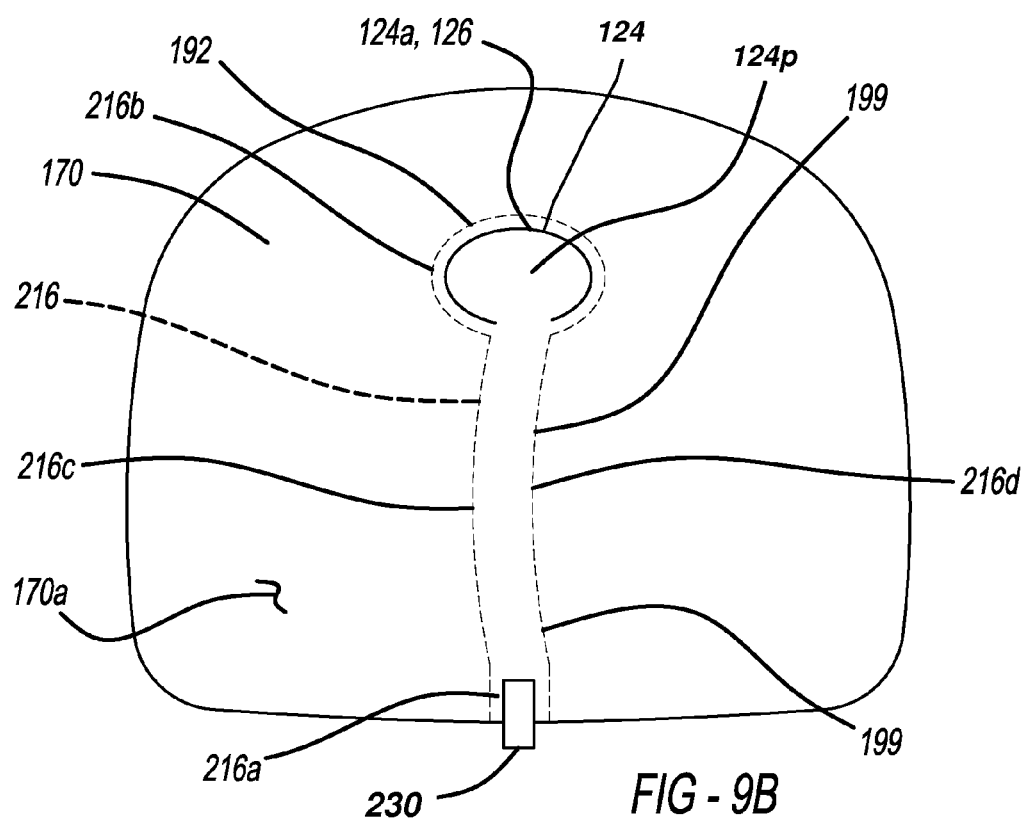
FIG. 9B shows a schematic cross-sectional side view of the airbag shown in FIG. 9A.

FIGS. 9A-9D show another embodiment 216 of a vent actuation system. FIG. 9A shows a schematic cross-sectional front view of an inflated airbag 170 incorporating an active vent actuation system operatively coupled to the airbag 170 such that a vent cover 216 covers and seals a supplemental vent hole 124 formed in the airbag. FIG. 9A shows the airbag 170 prior to activation of the vent actuation system. FIG. 9B shows a schematic cross-sectional side view of the airbag shown in FIG. 9A. For purposes of description, the actuator housing 230 shown in FIGS. 9A-9D is the embodiment shown in FIGS. 4A-4C. However, other embodiments of the actuator housing may be used in a manner similar to that described herein.

Referring to FIG. 9A, the pressurized fluid source housing 230 may be mounted on the same structure (for example, reaction can 700) as the inflator 110 which generates fill gas for the airbag 170, as previously described. Alternatively, housing 230 may be mounted to any other suitable portion of an airbag module or to a portion of the vehicle on which the airbag is mounted. The connector end of the housing 230 is electrically connected to an activation signal source (for example, an electronic control unit (ECU) (not shown)). In this embodiment, a portion 124*p* of the airbag wall is cut to form a vent hole 124. The edges 124*a* of the cut portion 124*p* are then re-attached to the airbag wall using a frangible securement means 126 (for example, readily-torn stitching or weakened stitching) as previously described.

A vent cover 216 is formed from a single layer of material (for example, an airbag material as previously described). The vent cover 216 has a first end 216*a*, a second end 216*b*, and a pair of opposite side edges 216*c* and 216*d*. Vent cover first end 216*a* is attached to the airbag wall 170*a* proximate the pressurized fluid source housing 230, so as to encapsulate at least the portion of the fluid source from which pressurized gases will flow, and so as to form a gas-tight seal between the vent cover first end 216*a* and the airbag wall. Vent cover first end 216*a* may also be attached directly to the fluid source housing 230, as previously described.

In the embodiment shown, the vent cover first end 216*a* and side edges 216*c* and 216*d* are attached to the interior surface of airbag wall 170*a* using a non-frangible or permanent attachment means 199 (for example, stitching which is similar to that used to stitch other portions of the airbag and which is structured to remain intact during operation of the airbag). This permanent attachment means 199 is also structured to provide a gas-tight seal between the vent cover 216 and the portions of the airbag wall 170*a* to which they are attached.

In one embodiment, the edges of the vent cover second end 216*b* are structured to be coextensive or substantially coextensive with the edges of airbag wall cut portion 124*p* when the vent cover second end 216b is positioned to overlie the cut portion 124p. This enables the vent cover second end 216b to be secured to the airbag wall 170a using the same frangible securement means 126 (for example, stitching) used to secure the cut portion 124p to the remainder of the airbag wall. Thus, rupturing of this frangible securement means 126 will enable both the vent cover second end 216b and the cut portion 124p to move away from the airbag wall and also away from each other. In an alternative embodiment, the airbag wall cut portion 124p is attached to the remainder of the airbag wall by a first frangible securement means 126, while the edges of the vent cover second end 216b overlap the edges of the cut portion 124p and are secured to the airbag wall using a second frangible securement means 192.

In the configuration just described, the region between the vent cover 216 and the airbag wall 170a forms a passage 250 for pressurized gases. This passage extends between (and is defined by) the vent cover first end 216a, actuator housing 230, the vent cover side edges 216c and 216d, the vent cover second end overlying the cut portion 124, and the airbag wall 170a including cut portion 124.

Figure 9C:
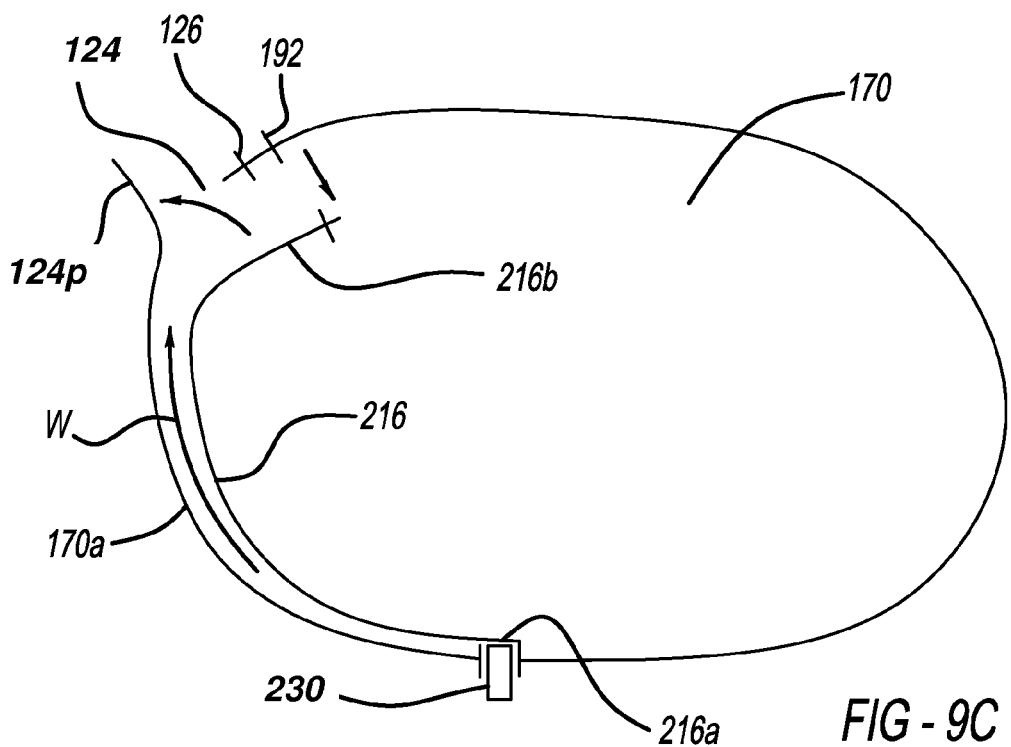
FIG. 9C shows the schematic cross-sectional front view of FIG. 9A immediately after rupture of a frangible securement means securing the vent cover over the vent opening.
Figure 9D:
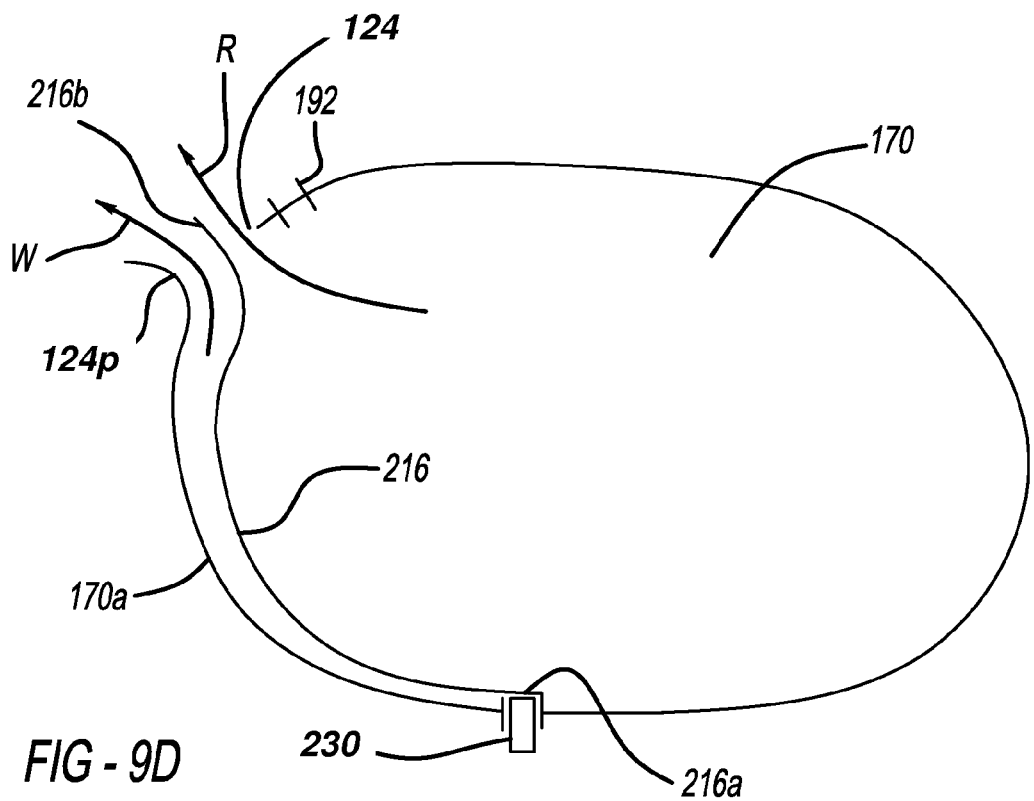
FIG. 9D shows the schematic cross-sectional side view of FIG. 9C during expulsion of airbag fill gas from the airbag interior.

Operation of this embodiment is shown in FIGS. 9C-9D and is similar to operation of the embodiment shown in FIGS. 8A-8D.

If it is determined (based on vehicle sensor inputs to an ECU, for example) that venting of airbag 170 is required, the ECU sends a signal to the pressurized gas source. Upon receipt of an activation signal by the housing 230, the pressurized gas source activates to produce a quantity of pressurized inflation gas which is injected into the flow passage 250 as indicated by arrow W, causing the passage to inflate along its length and/or causing gas to flow along its length. As shown in FIG. 9C, increasing pressure within the passage 250 causes disabling of the frangible securement means 192 securing the vent cover second end 216b to the airbag wall 170a and disabling of the frangible securement means 126 securing airbag wall cut portion 124p to the airbag wall 170a. Because both the vent cover second end 216b and the cut portion 124p are no longer attached to the airbag wall, the end of passage 250 is open to the airbag interior, and pressurized gases are free to flow from the airbag interior out of the vent hole 124, thereby reducing the internal pressure of the airbag. The second end 216b of the vent cover 216 may be expelled from the vent hole 124 during outflow of inflation gas from the airbag as indicated by arrow R, thereby releasing the remainder of the vent cover fill gas to the environment exterior of the airbag.

In another embodiment, a single airbag incorporates multiple vents and vent covers in accordance with one or more of the embodiments described herein.

In another alternative embodiment (not shown) similar to the embodiment shown in FIGS. 9A-9D, the actuator housing and the vent cover are positioned exterior of the airbag, with the vent cover first end 216a and side edges 216c and 216d are attached to an exterior surface of airbag wall 170a using a non-frangible or permanent attachment means 199 (for example, stitching which is similar to that used to stitch other portions of the airbag and which is structured to remain intact during operation of the airbag). This permanent attachment means 199 is also structured to provide a gastight seal between the vent cover 216 and the portions of the airbag wall 170a to which they are attached. The edges of the vent cover second end 216b may be structured to be coextensive or substantially coextensive with the edges of airbag wall cut portion 124p when the vent cover second end 216b is positioned to overlie the cut portion 124p, as previously described. This enables the vent cover second end 216b to be secured to the airbag wall 170a using the same frangible securement means 126 (for example, stitching) used to secure the cut portion 124p to the remainder of the airbag wall. Thus, rupturing of this frangible securement means 126 will enable both the vent cover second end 216b and the cut portion 124p to move away from the airbag wall and also away from each other. In another alternative embodiment, the airbag wall cut portion 124p is attached to the remainder of the airbag wall by a first frangible securement means 126, while the edges of the vent cover second end 216b overlap the edges of the cut portion 124p along the exterior of the airbag wall, and are secured to the airbag wall using a second frangible securement means 192 as previously described.

In the configuration just described, the region between the vent cover 216 and the airbag wall 170a forms a passage for pressurized gases along the airbag exterior. This passage extends between (and is defined by) the vent cover first end 216a, actuator housing 230, the vent cover side edges 216c and 216d, the vent cover second end overlying the cut portion 124, and the airbag wall 170a including cut portion 124.

Operation of this embodiment is similar to operation of the embodiment shown in FIGS. 9A-9D. If it is determined (based on vehicle sensor inputs to an ECU, for example) that venting of airbag 170 is required, the ECU sends a signal to the pressurized gas source. Upon receipt of an activation signal by the housing 230, the pressurized gas source activates to produce a quantity of pressurized inflation gas which is injected into the exteriorly mounted flow passage, causing the passage to inflate along its length and/or causing gas to flow along its length. As previously described, increasing pressure within the exteriorly mounted flow passage causes disabling of the frangible securement means 192 securing the vent cover second end 216b to the airbag wall 170a and disabling of the frangible securement means 126 securing airbag wall cut portion 124p to the airbag wall 170a. Because both the vent cover second end 216b and the cut portion 124p are no longer attached to the airbag wall, the end of passage 250 is open to the airbag interior, and pressurized gases are free to flow from the airbag interior out of the vent hole 124, thereby reducing the internal pressure of the airbag.

Figure 5:
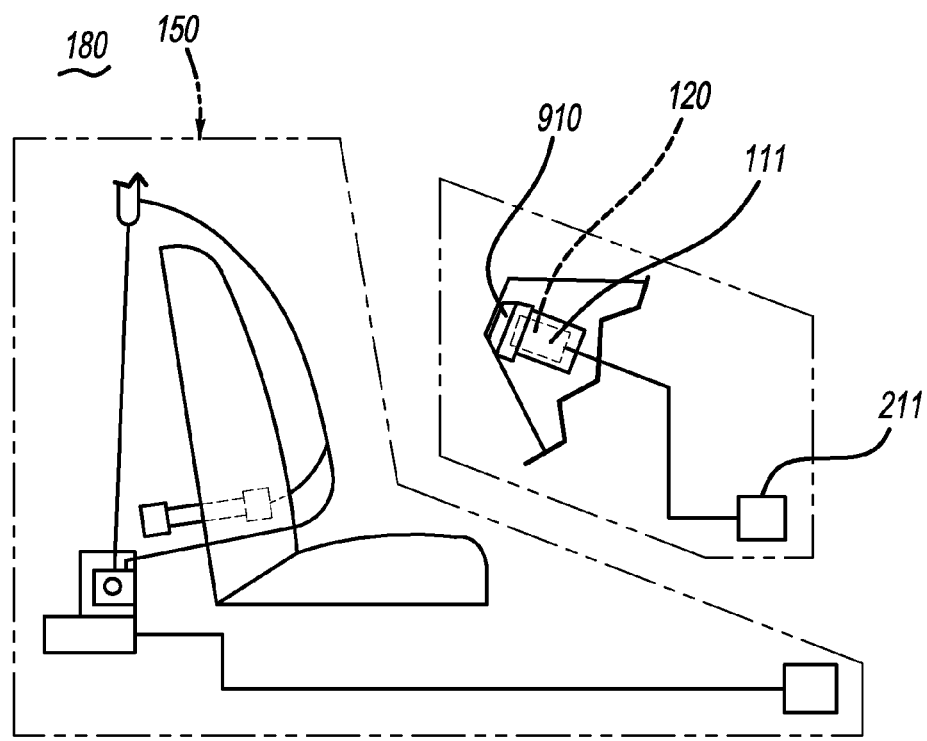
FIG. 5 is a schematic representation of a vehicle occupant protection system containing an active vent actuation system in accordance with an embodiment described herein.

Referring now to FIG. 5, an airbag including an embodiment of an active vent actuation system as described herein may be incorporated into an airbag module 910 installed in a vehicle. In addition, an airbag including an embodiment of an active vent actuation system as described herein (or an airbag module including such an airbag) may be incorporated into a comprehensive vehicle occupant protection system 180 including elements such as, for example, a safety belt assembly 150. FIG. 5 shows a schematic diagram of one exemplary embodiment of such a protection system. Airbag module 910 may be in communication with a crash event sensor 211 which is in communication with a controller incorporating a known crash sensor algorithm that signals actuation of airbag module 910 in the event of a collision.

It will be understood that the foregoing descriptions of the various embodiments are for illustrative purposes. As such, the various structural and operational features herein disclosed are susceptible to a number of modifications, none of which departs from the scope of the appended claims.

What is claimed is:

1. An airbag system comprising:
an airbag including a vent hole formed therein;

an actuator operatively coupled to the airbag, said actuator comprising an actuator housing and a support structure coupled to the housing; and a vent hole cover operatively coupled to the airbag so as to cover the vent hole and so as to form an enclosure extending between the actuator and the vent hole, wherein said actuator is attached to and operatively coupled to said vent hole cover about said support structure by stitching extending through said support structure to provide a gas seal between said actuator and said vent hole cover.

2. The system of claim 1 wherein, prior to activation of the actuator, the enclosure defines a gas flow passage separated from a portion of an airbag interior residing exterior of the enclosure.

3. The system of claim 1 wherein the enclosure is formed by an inflatable member.

4. The system of claim 1 wherein the enclosure is formed by a layer of material attached to a surface of a wall of the airbag such that the enclosure extends between the layer of material and the airbag wall.

5. The system of claim 1 wherein the actuator is structured to inflate the enclosure after activation of the actuator.

6. The system of claim 1 wherein the vent cover is attached to the actuator by stitching extending around a portion of the actuator so as to secure the actuator in position with respect to the vent cover.

7. A vehicle occupant protection system including an airbag system in accordance with claim 1.

8. The system of claim 1 wherein the vent hole is secured in a closed condition by a frangible securement means prior to activation of the actuator.

9. The system of claim 8 wherein the vent hole cover is attached to a wall of the airbag by a frangible securement means prior to activation of the actuator.

10. The system of claim 9 wherein the frangible securement means securing the vent hole in the closed condition and the frangible securement means attaching the cover to the airbag are structured to be rupturable responsive to an increase in pressure within the enclosure.

11. The system of claim 9 wherein the frangible securement means attaching the cover to the airbag is structured to be rupturable responsive to an increase in pressure within the enclosure.

12. An airbag system comprising:
an airbag including a vent opening formed in a wall of the airbag;
an actuator operatively coupled to the airbag, said actuator comprising an actuator housing and a support structure coupled to the housing; and
a vent cover operatively coupled to the airbag so as to form an enclosure extending between the actuator and the vent opening, the vent cover being secured to the airbag wall by a frangible securement means so as to cover the opening, said vent cover having a first end and a second end,
wherein said actuator is operatively coupled to said vent cover by stitching extending through said support structure and fixed within said vent cover first end to provide a gas seal between said actuator and said vent cover first end,
wherein the actuator is structured to pressurize the enclosure so as to disable the frangible securement means upon activation of the actuator.

13. A vehicle occupant protection system including an airbag system in accordance with claim 12.

14. A system for actuating an airbag vent, the system comprising:
an actuator comprising a housing and structured to generate a quantity of pressurized fluid upon activation of the actuator; and
a vent hole cover structured to be operatively coupled to an airbag so as to cover a vent hole formed in the airbag, and so as to form a gas flow passage extending between the actuator and the vent hole,
wherein said vent hole cover is fixed about said actuator housing to provide a gas seal between said actuator and said vent hole cover, and
wherein the vent cover is attached to the actuator by stitching extending through a portion of the actuator.

15. The system of claim 14 wherein the cover is structured to be operatively coupled to the airbag so as to form a gas flow passage fluidly isolated from a portion of an airbag interior that resides exterior of the passage, prior to activation of the actuator.

16. A vehicle occupant protection system including an airbag containing a system in accordance with claim 14.

* * * * *